United States Patent [19]

Rauchwerger

[11] 4,206,864
[45] Jun. 10, 1980

[54] ELECTRICALLY HEATED HIGH SPEED DE-SOLDERING TOOL

[76] Inventor: George P. Rauchwerger, 183-D Commercial Ave., Sunnyvale, Calif. 94086

[21] Appl. No.: 809,090

[22] Filed: Jun. 23, 1977

[51] Int. Cl.² .................... B23K 3/04; H05B 1/00; A47L 5/04
[52] U.S. Cl. .................... 228/20; 15/341; 15/344; 219/230; 219/236; 219/240; 228/53
[58] Field of Search .............. 219/230, 229, 236, 421, 219/240; 228/19, 20, 191, 264, 51-55; 15/341, 344

[56] References Cited

U.S. PATENT DOCUMENTS

| 878,329 | 2/1908 | Bimm | 15/341 |
|---|---|---|---|
| 995,911 | 6/1911 | Russel | 15/341 X |
| 1,034,597 | 8/1912 | Duryea | 15/341 X |
| 2,094,795 | 10/1937 | Johnson | 219/230 X |
| 2,960,591 | 11/1960 | Brillinger | 219/230 X |
| 3,024,343 | 3/1962 | Siwakoski | 219/230 X |
| 3,163,145 | 12/1964 | Duhaime et al. | 219/230 X |
| 3,279,674 | 10/1966 | Kopernak | 228/20 |
| 3,348,753 | 10/1967 | Isbrandt | 228/55 X |
| 3,469,759 | 9/1969 | Wamsink | 228/20 |
| 3,970,234 | 7/1976 | Litt et al. | 228/20 |

FOREIGN PATENT DOCUMENTS

| 2009865 | 9/1971 | Fed. Rep. of Germany | 228/20 |
|---|---|---|---|
| 1406683 | 6/1965 | France | 219/230 |
| 2105476 | 4/1972 | France | 228/20 |
| 693197 | 6/1953 | United Kingdom | 219/230 |
| 236225 | 4/1967 | U.S.S.R. | 219/230 |

Primary Examiner—A. Bartis
Attorney, Agent, or Firm—Julian Caplan

[57] ABSTRACT

A hand-held, trigger-actuated gun heats solder to be removed from a workpiece and sucks the molten solder from a hollow tip through a small-diameter suction tube into a larger-diameter chamber from which it may be removed at intervals through a discharge tube. The tip placed in contact with the solder is heated by a heater of the type used in soldering irons. A cylinder communicates with the chamber in such manner that solder is not drawn into the cylinder. The piston in the cylinder is actuated either by a solenoid energized when the trigger is pulled or by a mechanical linkage connected to the trigger.

4 Claims, 7 Drawing Figures

ELECTRICALLY HEATED HIGH SPEED DE-SOLDERING TOOL

This invention relates to a new and improved desoldering tool. Prior desoldering tools range from plunger types to sophisticated vacuum operated stations. Among these is a combination soldering iron with a hollow tip, a tube and a rubber bulb to provide desoldering with one-hand operation. Such a tool is inefficient since it must be cocked, put into position, a regular soldering iron used to melt the solder and then the tool is released, It is bulky and generally requires two hands to operate, thereby requiring that the work be fastened down. The sophisticated desoldering stations are expensive, not portable and require a source of compressed air which is expensive and has maintenance problems. A hollow tip soldering iron with a rubber bulb is awkward to use since the bulb must be squeezed and released while holding in the hand; and further, the rubber bulb does not have sufficient capacity to remove the solder entirely with the result that work is sloppy and the tip tends to become clogged.

Accordingly, a principal object of the present invention is to overcome the above-mentioned deficiencies of pre-existing desoldering tools by providing a fast, lightweight unit which can be used with one hand and can be produced at reasonable cost.

Another object of the invention is to provide a tool which is comfortably held in the hand and does not require such physical effort by the operator as to cause fatigue. In the present invention, the operator places the hot tip of the gun on the soldered joint, pulls a trigger with one finger and either electrically or mechanically the gun performs the vacuum operation.

A further feature of the invention is the fact that the gun is lightweight, can be plugged into any electrical socket and can be used in any location either on a bench or in the field.

Another problem of desoldering guns has been the clogging of the tip. By pulling the trigger of the present invention, solder which still remains in the tip is blown out, cleaning the tube for the next operation. For normal usage, all the solder at a joint is drawn into the waste solder chamber with one cycle of operation. However, when the amount of solder is excessive, a certain amount remains molten in the tube or tip. In one modification of the invention, by pulling the trigger, this excess molten solder is blown out. In another modification, the solder is not blown out, all of it is sucked into the waste solder chamber; this is accomplished by a one-way valve mechanism.

The tip is heated by an element similar to those used in soldering irons and reaches working temperature in thirty to sixty seconds. This eliminates the necessity of leaving the tool plugged in for long periods of time and conserves energy.

Because of the simplicity of construction, the tool can be mass produced at a low cost and maintenance costs are also extremely low.

Other objects of the present invention will become apparent upon reading the following specification and referring to the accompanying drawings in which similar characters of reference represent corresponding parts in each of the several views.

Figure 3:
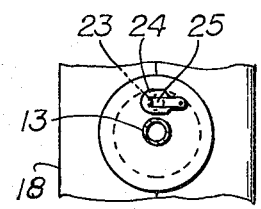
FIG. 3 is a fragmentary sectional view taken along the line 3—3 of FIG. 1.
Figure 4:
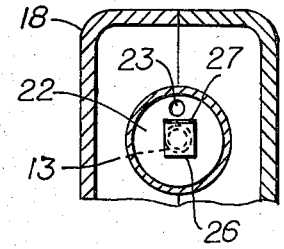
FIG. 4 is a similar fragmentary sectional view taken along the line 4—4 of FIG. 1.

The present invention is used on the bench or in the field to remove solder from a joint, such as on a printed circuit board. For this purpose, a hollow tip 11 is threaded into a Y 12 to which is connected a suction tube 13 and also a heater tube 14 of the type used in modern soldering irons having a heater coil 16 and connected to the Y 12 by a connector 17. The structure of the heater tube 14 is subject to considerable variation. Tubes 13 and 14 lead to a casing 18 which is hand-held by means of handle 19. Communicating with suction tube 13 inside the casing 18 is a waste solder chamber 21, and the outer end thereof is sealed by a cap seal 22. In cap 22 is an exhaust port 23, on the exterior of which is an exhaust flap 24. As shown in FIG. 3, the flap 24 is formed of neoprene or other material and is biased closed by a spring 25 which may be of phosphor-bronze or equivalent. On the inside of cap 22 is an inlet flap valve 26 shown in FIG. 4 hinged to the cap 22 by a hinge pin 27. The valve flaps 24 and 26 are oppositely biased and their working cycle is hereinafter explained.

Figure 1:
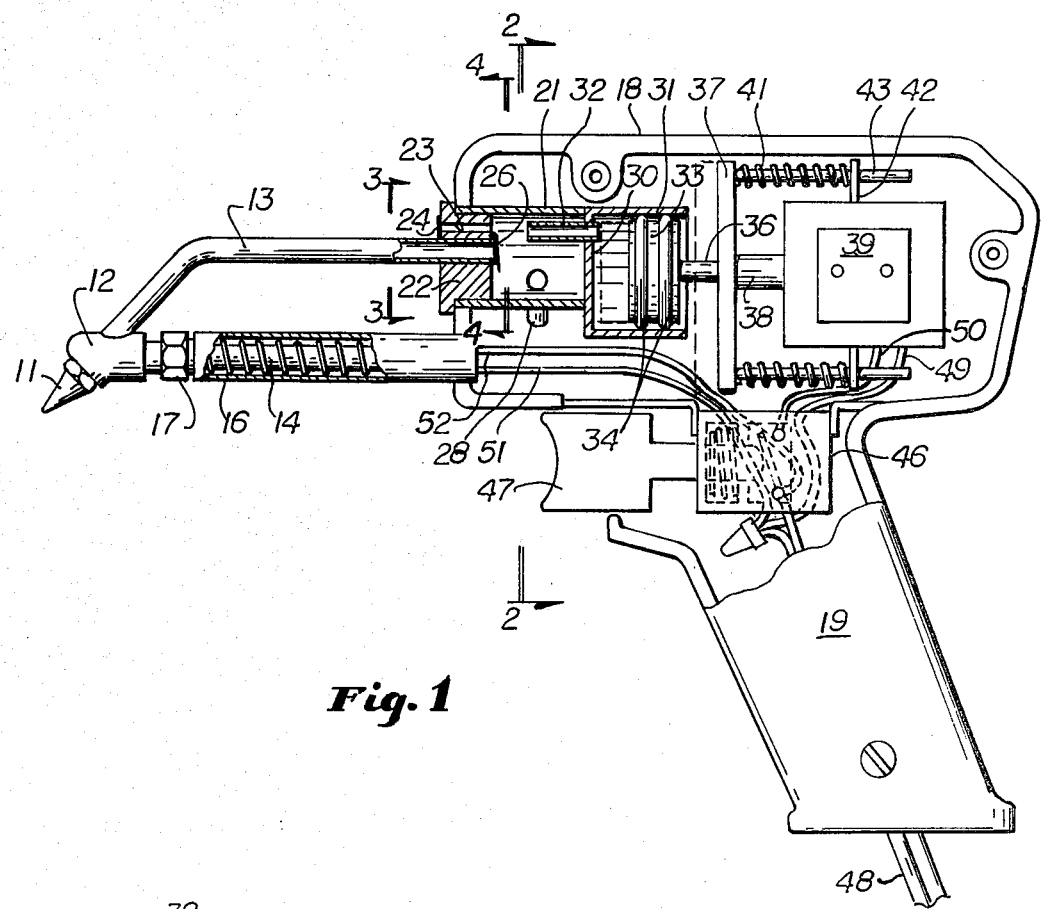
FIG. 1 is a side elevational view of one form of the invention with parts broken away to reveal internal construction.
Figure 2:
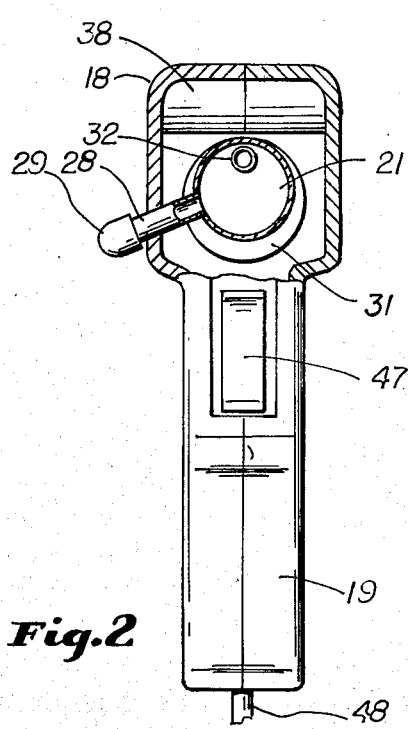
FIG. 2 is a sectional view taken substantially along the line 2—2 of FIG. 1.

A waste solder removal tube 28 extends out from waste solder chamber 21 to the exterior of casing 18 and is closed by a cap 29 (see FIG. 2). Rearward of chamber 21 is vacuum cylinder 31 separated therefrom by a partition 30 and in communication therewith by means of a tube 32. Within cylinder 31 is a piston 33 having rings 34 which engaged the inside walls of the cylinder 31. Connecting rod 36 of piston 33 is attached to a backing plate 37 fixed to the armature 38 of solenoid 39. Return springs 41 are compression springs wound around pin 43 and bearing against abuttment 42 connected to solenoid 39. Springs 41 bias the piston 33 to the dotted line position of FIG. 1 and the action of the solenoid 39 when energized is to pull the piston 33 to the solid line position. Tube 32 is located as illustrated and is dimensioned to prevent solder particles from entering cylinder 31, no matter in what position the tool is held. Tube 32 serves the communicate vacuum to tip 11 via tube 13 and to chamber 21.

At a convenient location on handle 19 is a switch 46 which is closed by means of a trigger 47. Electric cord 48 may be connected to any electrical outlet. Wire 50 leads from switch 46 to one terminal of solenoid 39. One of the wires of cord 48 is connected to switch 46. The switch 46 is connected to one end of coil 15 by line 52. The other wire of cord 48 is connected by line 49 to the other terminal of the solenoid 39 and by line 51 to the other end of coil 16.

In use, preliminarily the operator plugs in cord 48, which is directly connected to heater tube 14, to heat the tube 14 and the tip 11. As a variation of this invention a super-fast heating element (3–5 seconds) may be used. In that case, a two-position switch 46 is used. The first position energizes the tip, heating it first without actuating the solenoid. The second position maintains the tip hot and actuates the solenoid simultaneously. This variation is satisfactory for intermittent work; the other modification for continuous production, leaving the iron on all the time. When the tip 11 is sufficiently heated, it is placed in proximity to the solder to be removed and left there sufficiently long so that the solder becomes molten. Thereupon, the operator pulls the trigger 47 which energizes the solenoid 39 causing it to retract from its normal dotted line position of FIG. 1 to the solid line position. This draws a vacuum in the cylinder 31; and since cylinder 31 communicates by means of tube 32 to the chamber 21, it draws a vacuum in the chamber 21. This forces the flap 26 open and permits the flap 24 to remain closed. Drawing a vacuum in the chamber 21 sucks air and molten solder through tip 11, Y 12 and tube 13 into the chamber 21. When the trigger 47 is released, the springs 41 return the piston to the dotted line position of FIG. 1. This closes the flap 26 and opens the flap 24 allowing air to escape but not forcing solder back through tube 13. If the tip 11 or tube 13 are clogged, repeated energization of the trigger 47 will suck the solder up through the tube 13 and into the chamber 21. When excess solder accumulates in the chamber 21, it may be removed through tube 28 after removing the cap 29.

Figure 5:
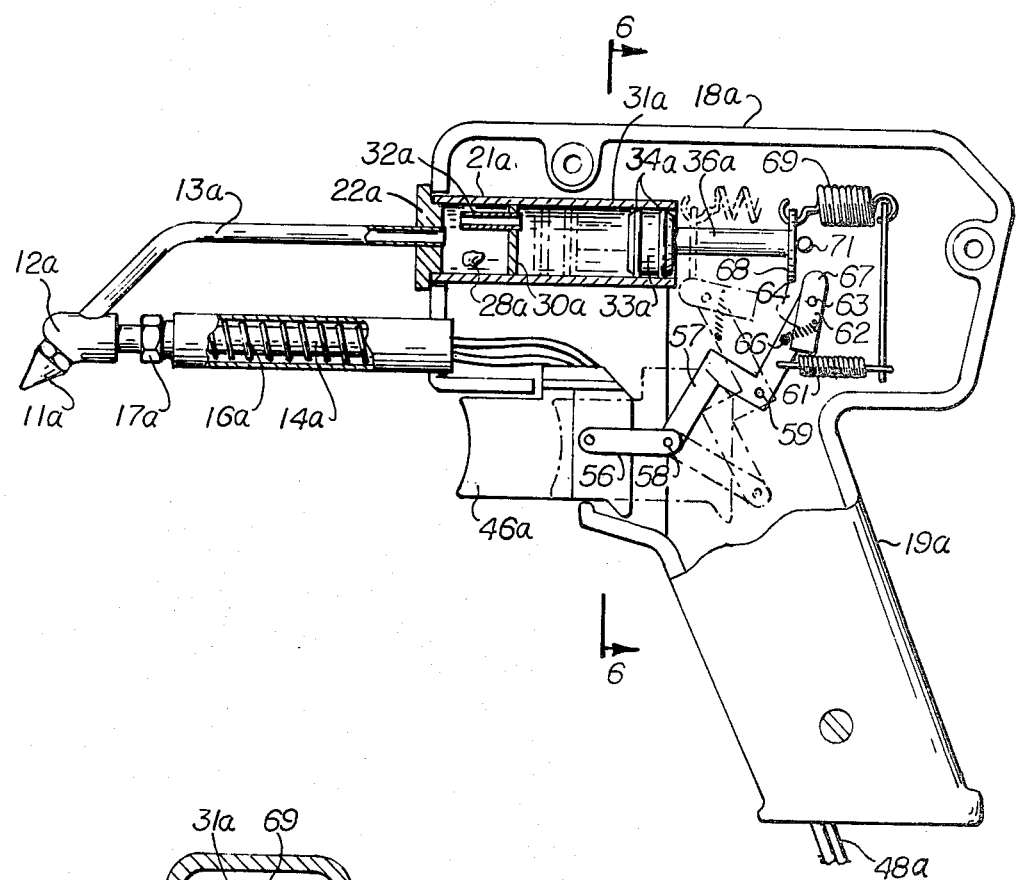
FIG. 5 is a view similar to FIG. 1 of modified construction.
Figure 6:
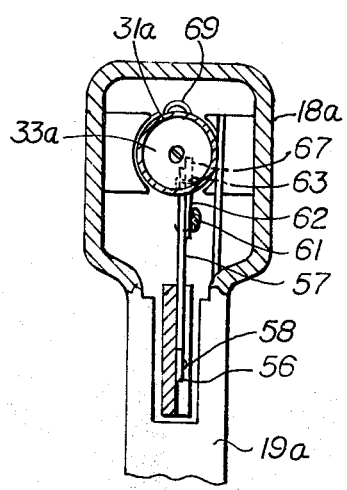
FIG. 6 is a sectional view taken substantially along the line 6—6 of the modification of FIG. 5.

Directing attention now to the modification shown in FIGS. 5 and 6, many of the parts are similar to those of the preceding modification, and the same reference numerals followed by the subscript a are used to designate corresponding parts. In this modification there is no solenoid but there is a mechanical linkage to the trigger 47a hereinafter explained. The coil 16a may either be continuously heated from the cord 48a or a switch (shown only schematically) associated with the trigger 47a may be employed.

The mechanical linkage between trigger 47a and piston 33a is as follows: A link 56 is pivotted to the inner end of trigger 47a. A bell-crank type lever 57 is connected to the link 56 by pin 58 and pivots from the solid line inoperative position of FIG. 5 in a counter-clockwise direction to the dot-and-dash position about pivot 59. Spring 61 biases the lever 57 to the solid line position of FIG. 5. A dog 62 is pivotted by pivot pin 63 to the end of lever 57 remote from pin 58, and this dog is pivotted to the solid line position shown in FIG. 5 by spring 64 which is connected at one end to stop 66. Stop 66 prevents dog 62 from pivotting in a clockwise direction beyond the position shown in FIG. 5. The upper end 67 of dog 62 is located so that when the lever 57 pivots in a counter-clockwise direction the end 67 engages the striker plate 68 which is fixed to the rear end of connecting rod 36a attached to piston 33a of vacuum cylinder 31a. Spring 69 biases the striker plate 68 to the solid line position shown in FIG. 5 and the striker plate 68 is prevented from moving to the right of the solid line position by stop 71.

In the operation of the modification of FIGS. 5 and 6, pulling the trigger 46a either closes the switch which energizes coil 16a or the coil 16a is continuously energized. Pulling the trigger 46a also sets in motion a mechanical linkage whereby the link 56 pivots the lower end of lever 57 to the rear, the lever 57 pivoting around its pivot 59 and causing the upper end 67 of dog 62 to engage striker plate 68 and force the connecting rod 36a and piston 33a to the left to the dot-and-dash position. As the parts reach the dot-and-dash position of FIG. 5, the rounded upper end 67 slides under the lower end of the striker plate 68 and thereupon the spring 69 returns the piston 33a to the solid line position with a very rapid motion. The rapid return of the piston 33a draws a vacuum through the tube 13a and tip 11a, sucking molten solder up through the tube 13a into the chamber 21a. Release of the trigger 46a allows the lever 57 to return to its solid line position, and at this time the dog pivots counter-clockwise to clear the striker plate 68.

Figure 7:
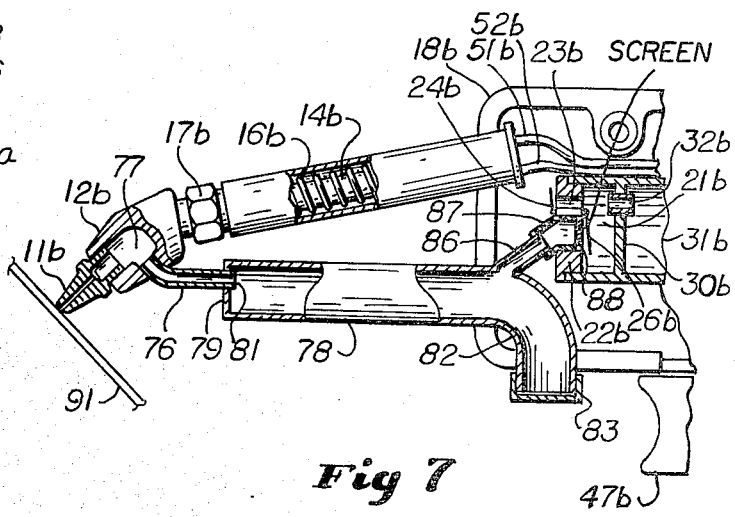
FIG. 7 is a fragmentary view similar to a portion of FIG. 1 of a further modification.

Directing attention now to the modification of the invention shown in FIG. 7, a replaceable hollow tip 11b is threaded into Y 12b. In the interior of "Y" 12b is a tip chamber 77 from which extends a small diameter suction tube 76 preferably of stainless steel so that solder does not stick thereto, although other materials may be used. Tube 76 is quite short to prevent solder from coiling and solidifying within the tube 76. The angle of tube 76 is such that solder is diverted from tip 11b as rapidly as possible, preventing solder from clogging the opening of the tip 11b. Immediately proximal to tube 76 is solder collecting tube 78 of larger diameter than chamber 76. With the plane 91 of the work (typically, a printed circuit board) disposed at an angle of about 45° and the device held in normal position, chamber 78 is approximately horizontal. It is, preferably, thin-walled stainless steel so that when solder is sucked through the tube 76 into the chamber 78 it cools rapidly and does not stick to the chamber 78. It will be noted that the distal end of chamber 78 is formed with a cap 79 through which the tube 76 extends. There is a protrusion 81 of the tube 76 into the chamber 78 to prevent solder from falling back into the tip 12b if the gun is held vertically. At the proximal end of chamber 78 are two branches. One branch 82 curves downwardly and is provided with a removable air-tight cap 83 from which solder which collects in chamber 78 may be removed periodically. The second branch 86 extends upwardly toward the chamber 21b. Preferably, a relatively flexible piece of tubing 87 slips over the end of suction tube 86 and connects through the opening in cap seal 22b.

The modification of FIG. 7 improves the solder sucking action and reduces tendency of the suction tubing to clog and improves the storing of the waste solder. The heating tube 16b is on the top and the suction tube 76 and solder-collecting chamber 78 are at the bottom, making it unnecessary to suck the solder upward. Tendency of the solder to be drawn up into the cylinder 31b is largely eliminated; and when necessary, a screen 88 may be installed in suction tube 86 to further reduce any likelihood of solder being drawn into the cylinder 31b. The plug 22b may be removed if necessary in order to clean the flabs 24b, 26b screen 88 and the chamber 21b.

The solder chamber 78 is made as thin as possible, not only to reduce weight but to dissipate heat rapidly and to prevent heat loss from the hot tip 11b. It is desirable that the molten solder be drawn into the chamber 78 before solidifying. The tube 76 is of lesser diameter than either the chamber 86 or the tube 78 so that a strong sucking action draws the solder from the chamber 77 in tip 11b.

In other respects, the modifications of FIGS. 5 and 6 and FIG. 7 are similar to those of FIGS. 1–4, and the same reference numerals followed by the subscripts a and b, respectively, are used to designate corresponding parts.

What is claimed is:

1. A desoldering tool comprising a casing having a handle, a hollow tip supported by said casing, a suction tube connected to and communicating with said tip, a heater tube discrete from said tip and from said suction tube for heating said tip, said heater tube extending from said casing to a position in heat-conducting contact with said tip, a heating coil in said heater tube, a solder-receiving chamber carried by and external to said casing communicating with said suction tube, said chamber being of larger cross-section than said suction tube and located spaced from said heater tube so that molten solder received in said chamber is rapidly solidified and does not run back through said tube to said tip, a cylinder in said casing formed with a partition dividing said cylinder into first and second portions, and partition being formed with an aperture, a branch tube communicating with said chamber at a location substantially elevated above the bottom of said chamber and leading upwardly from said chamber to said first portion of said cylinder so that solder is not drawn into said cylinder, a piston reciprocable in said second portion of said cylinder, said piston when moving away from said partition drawing a vacuum in said chamber and thence in said tip, a solenoid having an armature connected to said piston for moving when energized said piston from a first to a second position, spring means biasing said piston from said second to said first position, a source of current, a manually-actuated switch to energize said solenoid from said source, and a solder discharge tube extending downwardly-outwardly of and communicating with said chamber from a point below said branch tube, said discharge tube having an air-tight removable distally-disposed cap.

2. A tool according to claim 1 in which said solenoid is connected to said source through said switch.

3. A tool according to claim 1 which further comprises a vent in said first portion of said cylinder, a first check valve in said vent permitting discharge of air from said first portion, a second check valve between said branch tube and said first portion preventing discharge of air from said first portion out through said branch tube.

4. A desoldering tool comprising a casing having a handle, a hollow tip carried by said casing, a suction tube connected to and communicating with said tip, means for heating said tip discrete from said suction tube, a solder-receiving chamber carried by said casing communicating with said suction tube, a cylinder in said casing communicating with said chamber, a piston reciprocable in said cylinder, said piston when moving away from said chamber drawing a vacuum in said chamber and thence in said tip, manually-actuated means for reciprocating said piston, a spring biasing said piston away from said chamber, a solder-discharge tube extending outward of and communicating with said chamber, said discharge tube having an air-tight removable distally-disposed cap, said manually-actuated means comprising a trigger on said handle, a lever pivotally mounted in said casing, first means articulately connecting said trigger and lever, a striker plate fixed to said piston, a dog pivotted to said lever, a second spring biasing said dog to a first position whereby movement of said lever causes said dog to engage said striker plate to move said piston from a first to a second position, said dog disengaging from said striker plate as said piston reaches said second position, said first-mentioned spring rapidly returning said piston to said first position and drawing a vacuum in said suction tube, said casing and handle being shaped generally like a pistol, whereby the tool may be held and actuated with one hand only, leaving the other hand free to hold the work being desoldered.

* * * * *